(12) United States Patent
Edens

(10) Patent No.: US 6,712,380 B1
(45) Date of Patent: Mar. 30, 2004

(54) TRAILER

(76) Inventor: Dan L. Edens, N3344 County Rd. C, Prentice, WI (US) 54556

( * ) Notice: Subject to any disclaimer, the term of this patent is extended or adjusted under 35 U.S.C. 154(b) by 0 days.

(21) Appl. No.: 09/579,912

(22) Filed: May 26, 2000

Related U.S. Application Data

(60) Provisional application No. 60/136,814, filed on Jun. 1, 1999.

(51) Int. Cl.$^7$ .............................................. B60D 1/55
(52) U.S. Cl. ................................. 280/491.1; 280/474
(58) Field of Search ............................. 280/476.1, 402, 280/767, 491.1, 491.3, 491.4, 474

(56) References Cited

U.S. PATENT DOCUMENTS

| | | | | |
|---|---|---|---|---|
| 3,858,908 A | * | 1/1975 | Frank | 280/476 |
| 4,180,282 A | * | 12/1979 | Henning | 280/481 |
| 4,410,194 A | * | 10/1983 | Steilen | 280/86 |
| 4,512,593 A | * | 4/1985 | Ehrhardt | 280/460 R |
| 4,664,403 A | * | 5/1987 | Livingston | 280/460 |
| 4,968,210 A | * | 11/1990 | Friederich | 414/485 |
| 5,013,209 A | * | 5/1991 | DeMichele et al. | 414/563 |
| 5,161,814 A | * | 11/1992 | Walker | 280/414.5 |
| 5,221,100 A | * | 6/1993 | McNutt | 280/78 |
| 5,342,162 A | * | 8/1994 | Robinette et al. | 414/483 |
| 5,346,243 A | * | 9/1994 | Boeck | 280/478.1 |
| 5,544,944 A | * | 8/1996 | Keech | 298/5 |
| 5,553,989 A | * | 9/1996 | Ullman | 414/537 |
| 5,984,616 A | * | 11/1999 | Youmans et al. | 414/563 |

* cited by examiner

*Primary Examiner*—Lesley D. Morris
*Assistant Examiner*—L. Lum
(74) *Attorney, Agent, or Firm*—Skinner and Associates

(57) ABSTRACT

A trailer, comprising a trailer coupler portion, a trailer frame attached to the trailer coupler portion, and at least one caster wheel attached to the trailer frame. The trailer coupler portion comprises a trailer hitch including a proximal hitch portion, a distal hitch portion, a hinge link connecting the proximal hitch portion to the distal hitch portion, and a hitch locking mechanism adapted for locking the distal hitch portion in position with respect to the proximal hitch portion. The caster wheel(s) include a spindle attached to and adapted for swiveling with respect to the trailer frame. The trailer may further include a caster locking system adapted for preventing the spindle from swiveling with respect to the trailer frame. The caster locking system includes a drum attached to the spindle of the caster wheel(s) and further includes a hitch pin lock having a body and a pin. The drum has a pin aperture through which the pin may extend to prevent the spindle from swiveling.

21 Claims, 17 Drawing Sheets

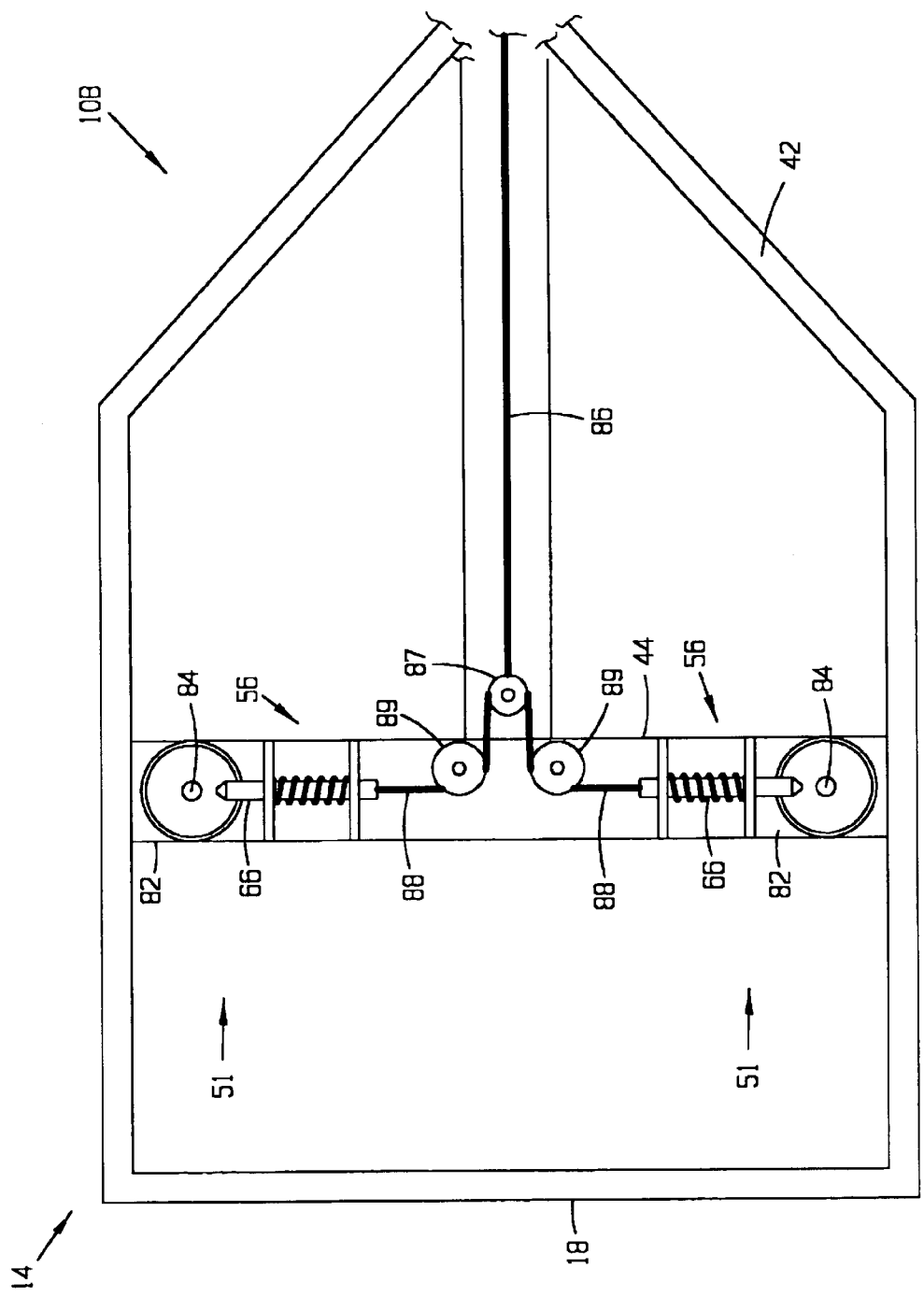

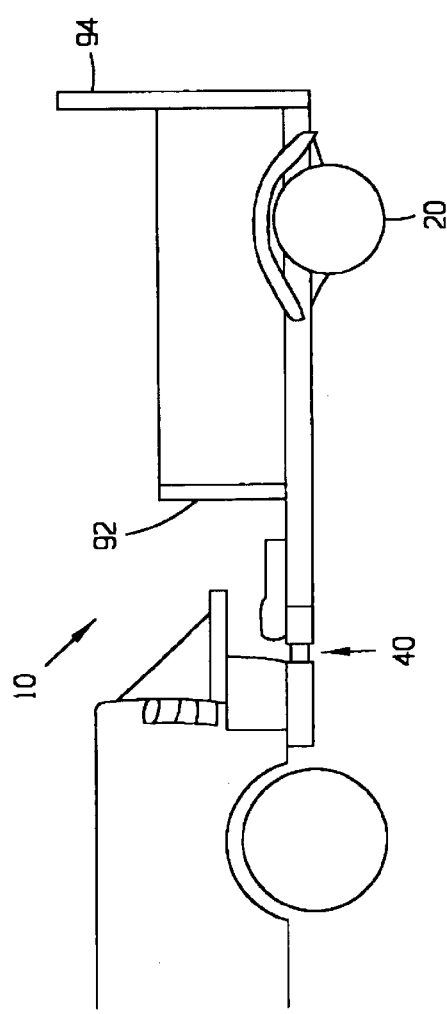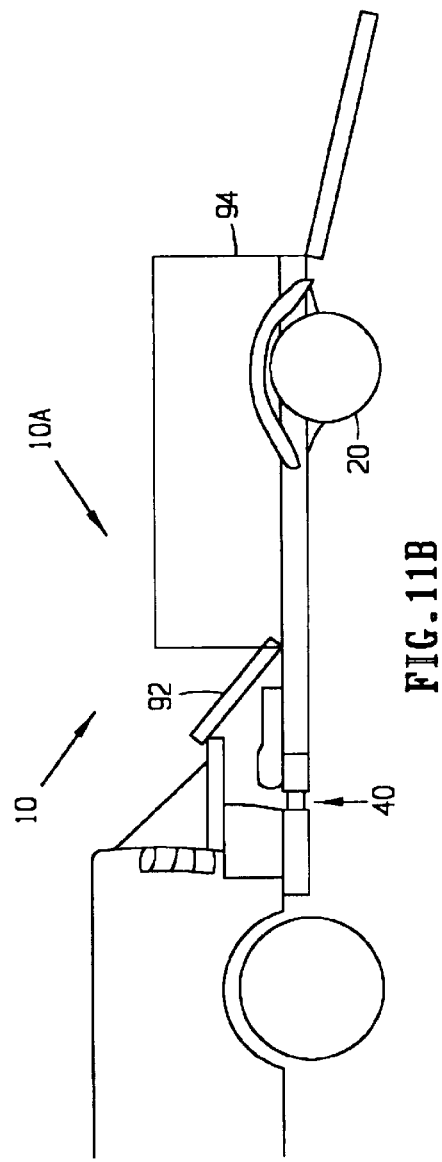

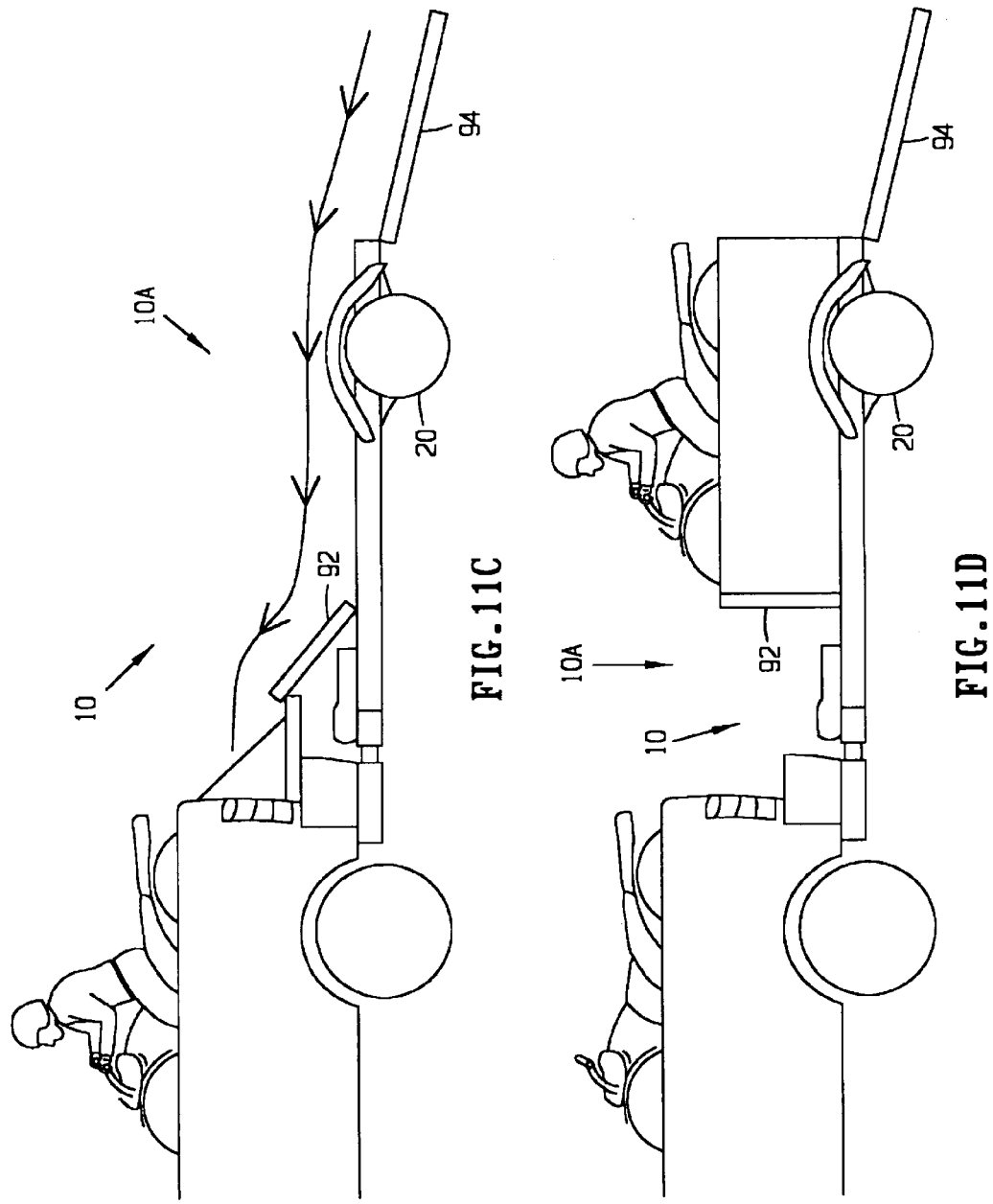

TRAILER

CROSS-REFERENCE TO RELATED APPLICATIONS, IF ANY

This application claims the benefit under 35 U.S.C. §119 (e) of co-pending provisional application Ser. No. 60/136,814, filed Jun. 1, 1999.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to trailers. More particularly, the invention relates to trailers having free-swivel caster wheels.

2. Background Information

The state of the art includes various trailers. These trailers are believed to have significant limitations and shortcomings. Specifically, it can be very difficult and frustrating to back up conventional trailers. This is especially true for small trailers because of their short length and their short height and width which may prevent it from being seen from the driver's position. These shorter trailers include, for example, utility trailers, boat trailers, and snowmobile, motorcycle and all-terrain vehicle trailers.

The present invention provides a trailer which is believed to constitute an improvement over the known art.

BRIEF SUMMARY OF THE INVENTION

The present invention provides a trailer, comprising a trailer coupler portion, a trailer frame attached to the trailer coupler portion, and at least one caster wheel attached to the trailer frame. The trailer coupler portion comprises a trailer hitch, which in a preferred embodiment includes a proximal hitch portion, a distal hitch portion, a hinge link connecting the proximal hitch portion to the distal hitch portion, and a hitch locking mechanism adapted for locking the distal hitch portion in position with respect to the proximal hitch portion. The caster wheel(s) include a spindle attached to and adapted for swiveling with respect to the trailer frame. The trailer may further include a caster locking system adapted for preventing the spindle from swiveling with respect to the trailer frame. The caster locking system includes a drum attached to the spindle of the caster wheel(s) and further includes a hitch pin lock having a body and a pin. The drum has a pin aperture through which the pin of the hitch pin lock may extend to prevent the spindle from swiveling.

The trailer coupler portion of the trailer is removably attached to a hitch coupler portion, which itself is adapted for attachment to a vehicle hitch. The trailer and the hitch coupler portion form a trailer system. The hitch coupler portion includes a connection member adapted for attachment to the vehicle hitch, and a lateral member having an attached ball at a first end and another attached ball at a second end. The trailer coupler portion includes a lateral member having a socket at a first end and another socket at a second end. These sockets are adapted for mating or operationally engaging with the balls attached to the hitch coupler to both limit twisting forces in the trailer and still allow the vehicle and trailer to smoothly negotiate over hills and bumps.

The trailer system of the present invention has a "rigid trailer hitch" embodiment and a "hinged trailer hitch" embodiment. The rigid trailer hitch embodiment is generally preferred if the trailer has a relatively shorter length, i.e. approximately under 7 feet. In the rigid trailer hitch embodiment, the caster wheels constantly swivel and the trailer hitch is constantly rigid. Because of the shorter length of the trailer, the rigid trailer hitch embodiment will not extend into another lane of traffic and pose a road hazard. Further, because of the swiveling of the caster wheels, a vehicle operator towing this rigid trailer hitch embodiment can back up as if the trailer was not attached. The rigid trailer hitch embodiment can be used, for example, in small utility trailers or in trailers designed to pull snowmobiles, all-terrain vehicles, motorcycles and personal water craft.

The hinged trailer hitch embodiment is generally preferred if the trailer has a relatively longer length, i.e. approximately over 7 feet. Because of the longer length of the trailer, it is desirable for the trailer hitch to be hinged or to pivot as it trails the towing vehicle. It is also desirable to prevent the caster wheels from swiveling when the trailer is towed on the road. Otherwise, the longer trailer could become a road hazard by extending into another lane of traffic. Furthermore, when the trailer backs up, it is desirable for the trailer hitch to be rigid and for the caster wheels to swivel so that the operator of the towing vehicle can avoid the problems associated with backing up conventional, hinged trailers. The hinged trailer hitch embodiment includes a hitch locking mechanism adapted for preparing the trailer to be backed up by locking the proximal hitch portion with respect to the distal hitch portion and releasing the caster wheels. The hitch locking mechanism further is adapted for preparing the trailer for road travel by releasing the proximal hitch portion with respect to the distal hitch portion and locking the caster wheels. The hinged trailer hitch embodiment can be used, for example, in longer trailers such as boat trailers.

The features, benefits and objects of this invention will become clear to those skilled in the art by reference to the following description, claims, if any, and drawings.

BRIEF DESCRIPTION OF THE SEVERAL VIEWS OF THE DRAWING

FIG. 5 is a side view of the hitch coupler portion taken along line 5—5 of FIG. 4a.

FIG. 7b is a bottom view of the hinged trailer hitch of FIG. 7a.

FIG. 7c illustrates the hinged trailer hitch embodiment prepared for road travel, and shows a bottom view in which the caster wheels are locked.

FIG. 8b is a bottom view of the hinged trailer hitch of FIG. 8a.

FIGS. 11a–11d illustrate the rigid trailer hitch embodiment as an all-terrain vehicle trailer, wherein the hinged front and rear walls form ramps between the ground and trailer floor, and the trailer floor and a vehicle bed.

DETAILED DESCRIPTION

Figure 1:
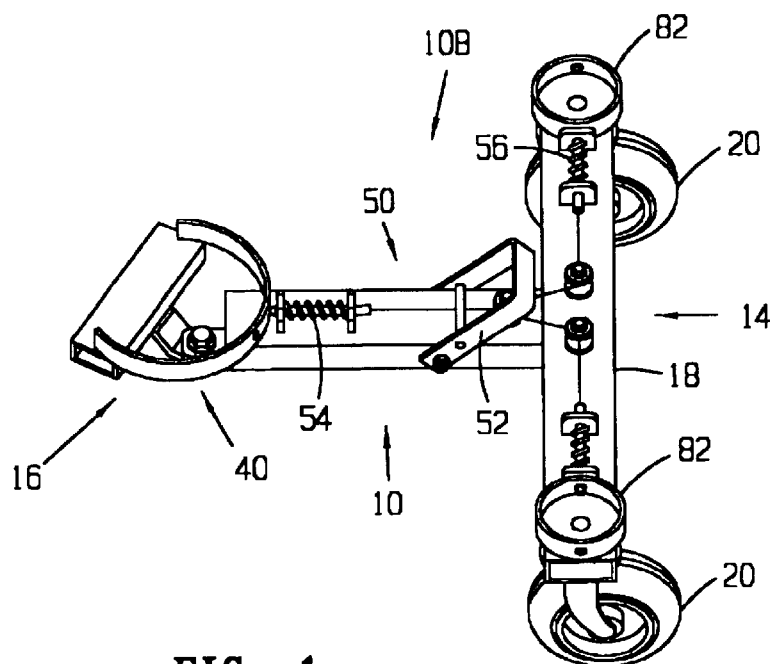
FIG. 1 is an illustration of a model of the hinged trailer hitch embodiment which is prepared for road travel, wherein the hitch locking mechanism has released the trailer hitch and the caster locking system has locked the caster wheels.

Referring to FIGS. 1–19, examples of the preferred embodiments of the present invention are illustrated and generally indicated by the reference numeral 10. The present invention provides a trailer system 10 which generally comprises a hitch coupler portion 12 adapted to be attached to a vehicle hitch (not shown), and a trailer 14 attached to the hitch coupler portion 12. The trailer 14 of the present invention includes a trailer coupler portion 16 that is removably attached to the hitch coupler portion 12, a trailer frame 18 attached to the trailer coupler portion 16, and at least one caster wheel 20 attached to the trailer frame 18. The illustrated embodiments shown in the figures have two caster wheels 20.

Figure 3:
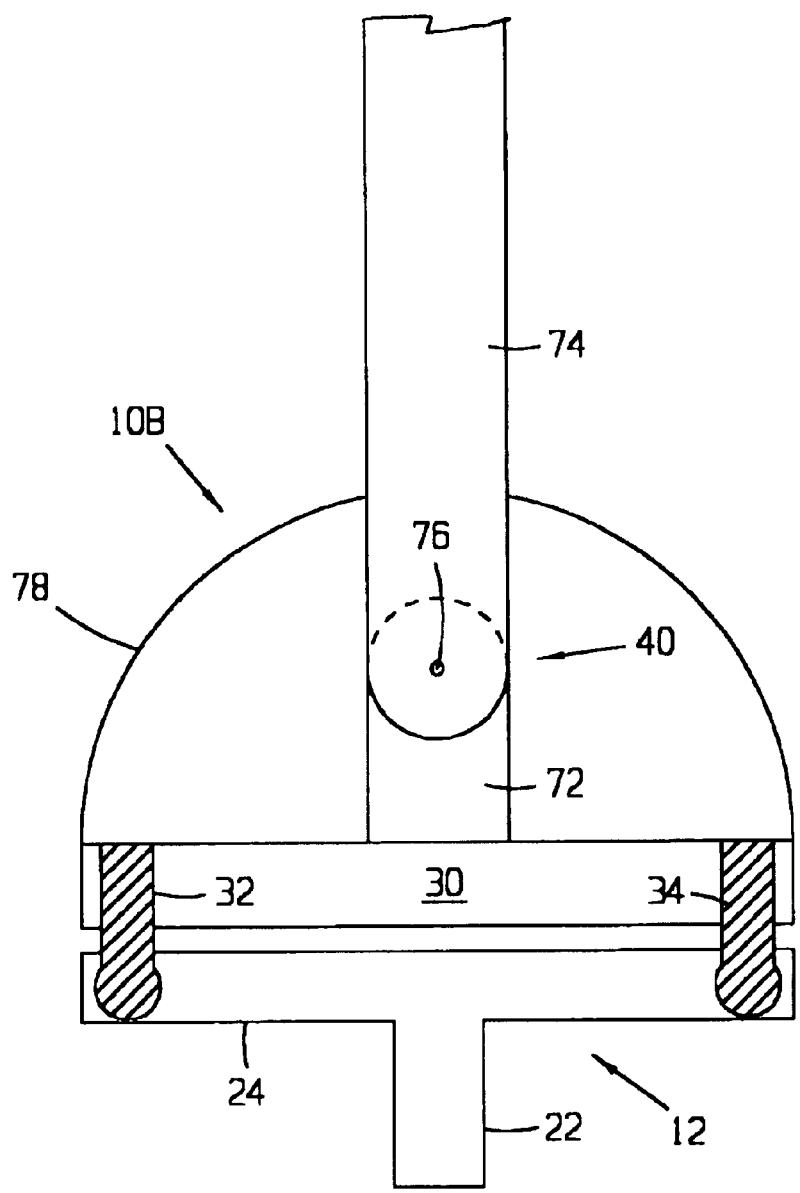
FIG. 3 is a top view of the trailer coupler portion and the hitch coupler portion.
Figure 4A:
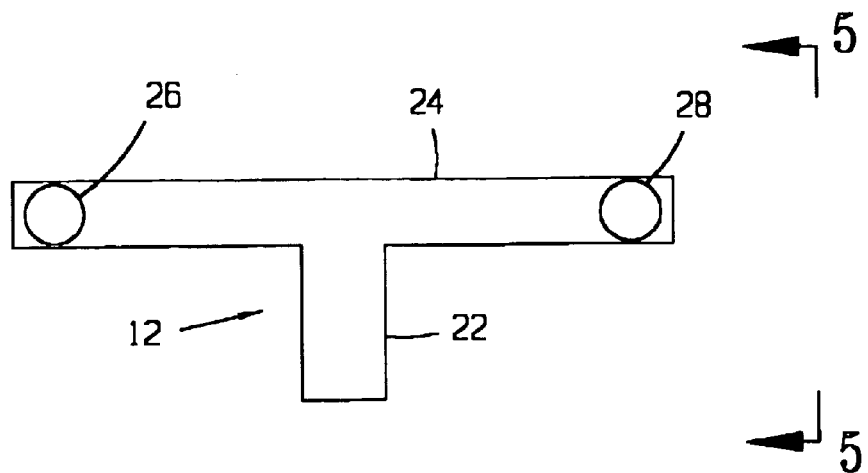
FIG. 4a is a top view of the hitch coupler portion.
Figure 4B:
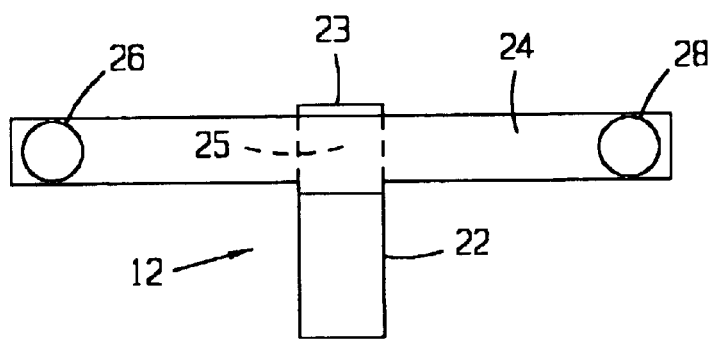
FIG. 4b is a top view of the hitch coupler portion with a connection member connected to and adapted for swiveling with respect to the lateral member.
Figure 5:
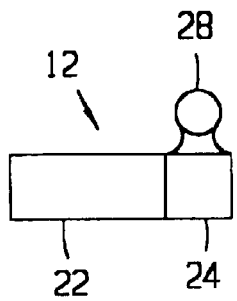

Referring to FIGS. 3, 4a and 5, the hitch coupler portion 12 includes a connection member 22 adapted to be attached to the vehicle hitch 40, and a lateral member 24 having an attached ball 26 at a first end and another attached ball 28 at a second end. The lateral member 24 is orthogonal to the connection member 22, and may be welded or other wise affixed together as shown. Alternatively, the connection member 22 may include an axle 23 and the lateral member 24 may include a bushing 25. The axle 23 of the connection member 22 is received by and swivels within the bushing 25 of the lateral member 24. This swivel motion compensates for uneven terrain between the tow vehicle and the trailer 14, which prevents unnecessary twisting of the trailer hitch 14.

Referring specifically to FIG. 3, the trailer coupler portion 16 includes a lateral member 30 having a socket 32 at a first end and another socket 34 at a second end. These sockets 32 and 34 are adapted for mating with or operationally engaging the balls 26 and 28 to limit twisting forces in the trailer while still allowing the vehicle and trailer 14 to smoothly negotiate over hills and bumps. The trailer coupler portion 16 further includes a hitch portion 40 that is attached to the trailer frame 18. The trailer frame 18 comprises a skirt 42 and a cross bar 44.

The trailer system 10 of the present invention has a "rigid trailer hitch" embodiment 10a and a "hinged trailer hitch" embodiment 10b. The rigid trailer hitch embodiment 10a is generally preferred if the trailer 14 has a relatively shorter length, i.e. approximately under 7 feet. In the rigid trailer hitch embodiment 10a, the caster wheels 20 constantly swivel and the trailer hitch 40 is constantly rigid. Because of the shorter length of the trailer 14, it will not extend into another lane of traffic and pose a road hazard, even though the trailer hitch 40 is rigid. Further, because of the swiveling of the caster wheels 20, a vehicle towing this rigid trailer hitch embodiment 10a can back up without additional effort as if the trailer 14 was not attached. The rigid trailer hitch embodiment 10a can be used, for example, in small utility trailers or in trailers designed to pull snowmobiles, all-terrain vehicles, motorcycles and personal water craft.

The hinged trailer hitch embodiment 10b is generally preferred if the trailer 14 has a relatively longer length, i.e. approximately over 7 feet. Because of the longer length of the trailer 14, it is desirable for the trailer hitch 40 to be hinged or to pivot between a proximal hitch portion 72 and a distal hitch portion 74, and it is also desirable to prevent the caster wheels 20 from swiveling when the trailer 14 is pulled behind a vehicle on the road. Otherwise, the longer trailer 14 could become a road hazard by extending into another lane of traffic. Furthermore, when the trailer 14 backs up, it is desirable for the trailer hitch 40 to be rigid and for the caster wheels 20 to swivel. The hinged trailer hitch embodiment 10b includes a hitch locking mechanism 50 adapted for preparing the trailer 14 to be backed up by locking the proximal hitch portion 72 with respect to the distal hitch portion 74, and releasing the caster wheels 20. The hitch locking mechanism 50 is further adapted for preparing the trailer 14 for road travel by releasing the proximal hitch portion 72 with respect to the distal hitch portion 74, and locking the caster wheels 20. The hinged trailer hitch embodiment 10b can be used, for example, in longer trailers such as boat trailers.

Figure 2:
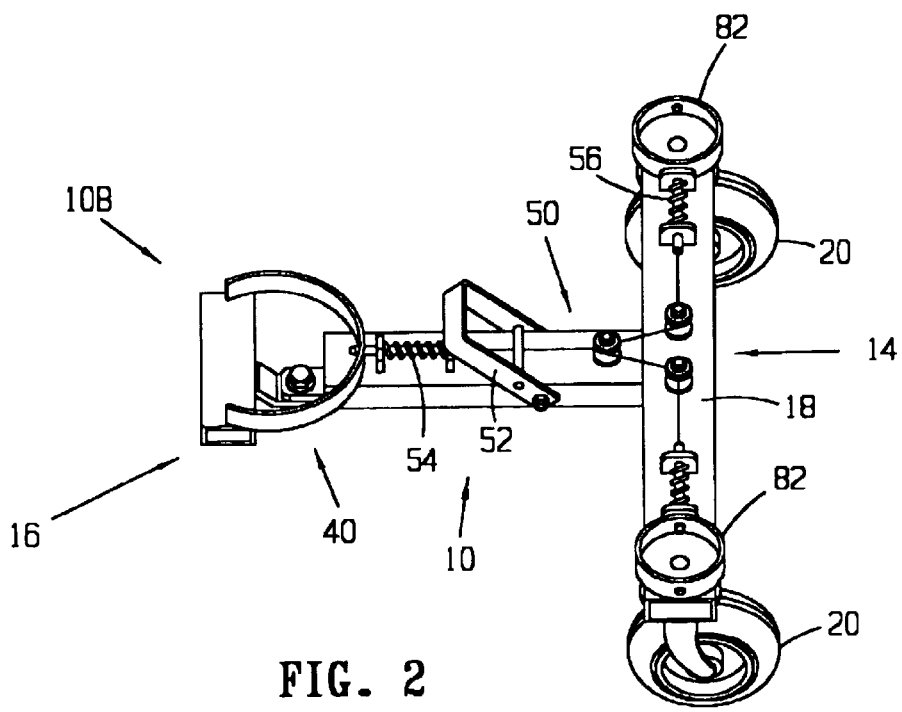
FIG. 2 is an illustration of a model of the hinged trailer hitch embodiment which is prepared for backing up, wherein the hitch locking mechanism has locked the trailer hitch and the caster locking system has released the caster wheels.

FIGS. 1 and 2 illustrate a model of the hinged trailer hitch embodiment 10b and shows the hitch locking mechanism 50 and caster locking system 51 on the top of the model for clarity. However, the hitch locking mechanism 50 and the caster locking system 51 preferably are below the trailer frame 18. A single handle 52 is shown as an interface for both the hitch locking mechanism 50 and the caster locking system 51, although it is anticipated that separate interfaces may be used and that other manual or automatic interfaces may be incorporated into the design of the present invention. Referring to example shown in the figures, the handle 52 is positioned to pull on a spring-loaded hitch pin lock 54 to release the proximal hitch portion 72 from the distal hitch portion, and to simultaneously allow spring-loaded caster pin locks 56 to lock the caster wheels 20 in position. Thus, the illustrated trailer system 10b of FIG. 1 is prepared for road travel. In FIG. 2, the handle 52 is positioned to pull on the spring loaded caster pin locks 56 to release the caster wheels 20, and to simultaneously allow the spring-loaded hitch pin lock 54 to lock the hitch portion 40 in position. Thus, the illustrated trailer system 10b of FIG. 2 is prepared for backing up.

Figure 6:
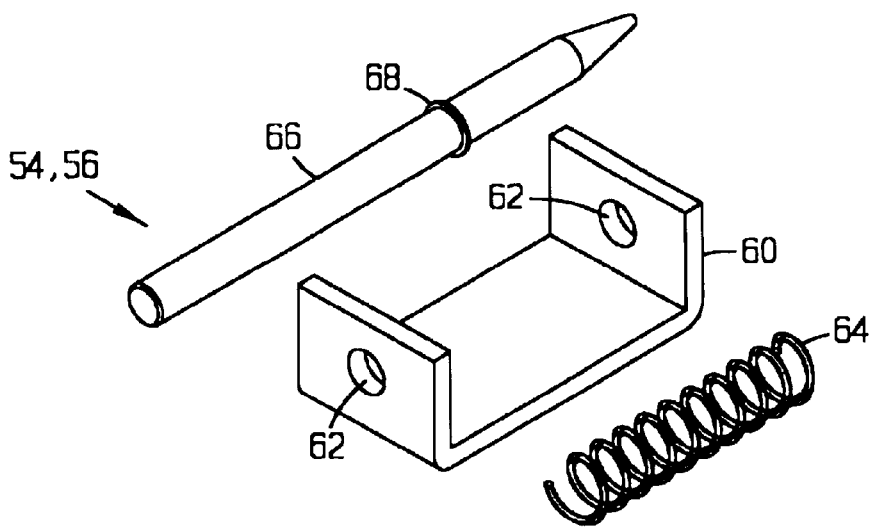
FIG. 6 is an exploded view of a pin lock used within the hitch locking mechanism and the caster locking system.
Figure 7A:
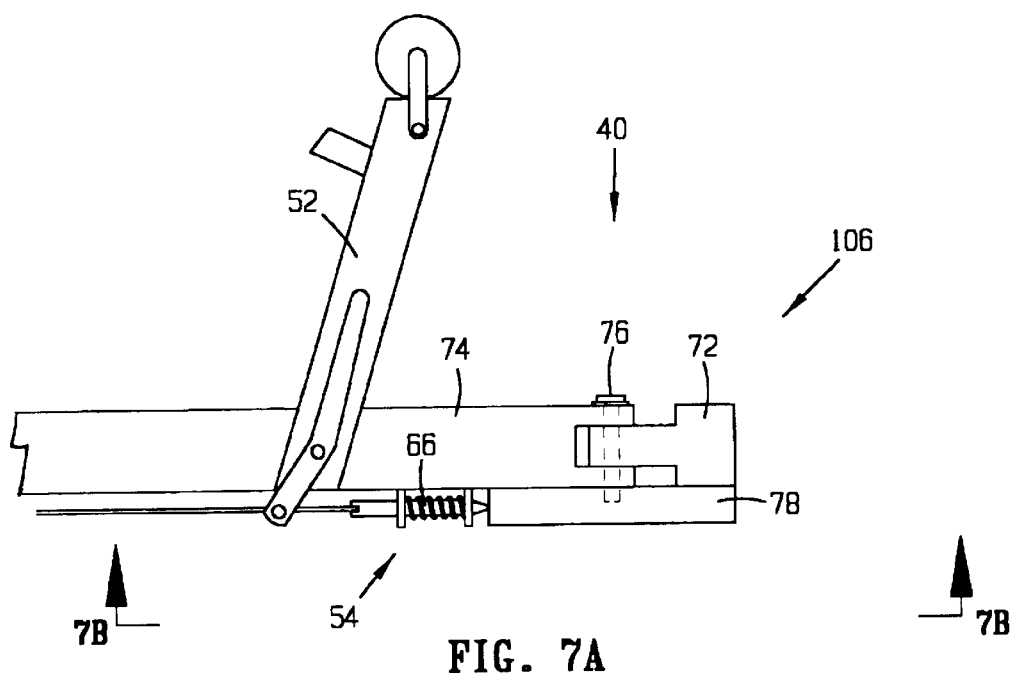
FIG. 7a illustrates a hinged trailer hitch embodiment prepared for road travel, and shows a side view in which the proximal hitch portion is released with respect to the distal hitch portion.
Figure 7B:
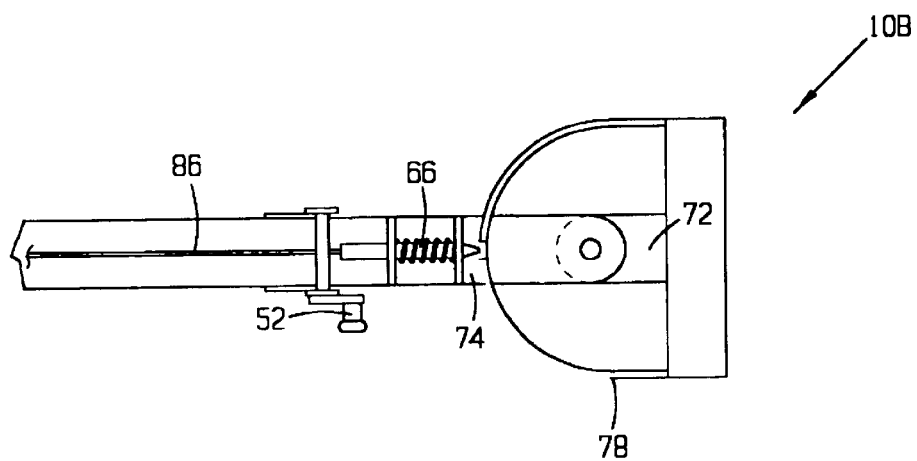

The spring-loaded pin locks 54, 56 are illustrated in the exploded view of FIG. 6. The pin locks generally comprise a body 60, illustrated as a unshaped body like channel iron, having opposing apertures 62. A spring 64 surrounds a pin 66, which is inserted through the apertures 62. The spring 64 is compressed between the body 60 and an abutment 68 on the pin 66. The spring 64 biases or loads the pin 66 in an extended position where it can engage pin holes or openings in the hitch drum 78 or caster drum 82.

FIGS. 3, 7a–b, and 8a–b illustrate the trailer hitch 40 for the hinged trailer hitch embodiment 10b in more detail. The illustrated trailer hitch 40 is shown as a clevis-style hitch, and generally comprises a proximal hitch portion 72 and a distal hitch portion 74 connected by a linking pin 76. A hitch drum 78 having a pin hole, aperture or other opening is attached to the proximal hitch portion 72, and the hitch pin lock 54 is attached to the distal hitch portion 74. The two hitch portion 72 and 74 cannot pivot with respect to each other when the pin extends into the aperture of the hitch drum 78.

Figure 8A:
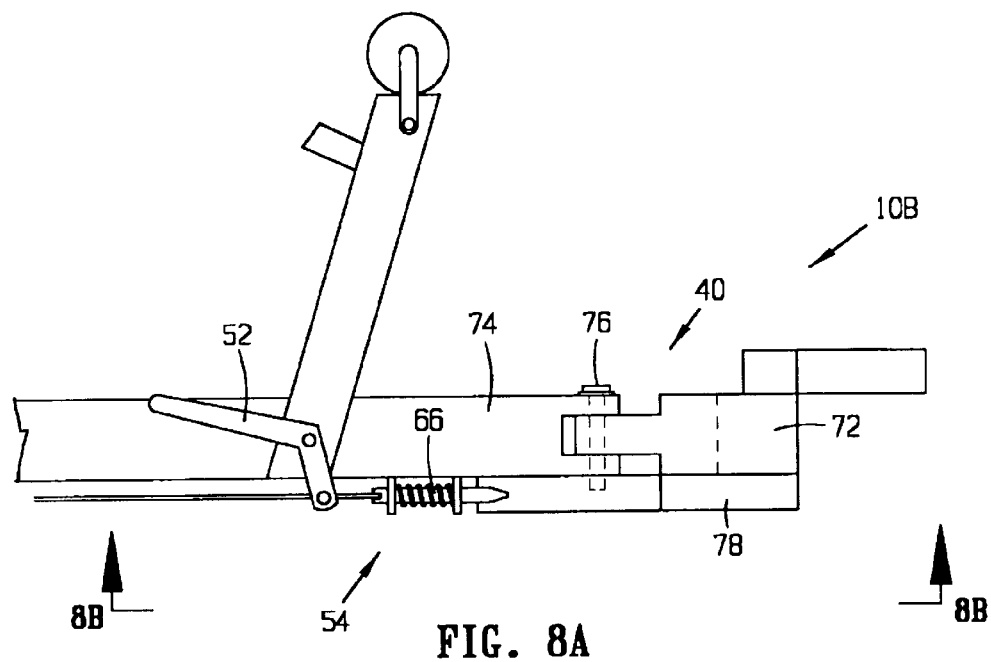
FIG. 8a illustrates hinged trailer hitch embodiment prepared for backing up, and shows a side view in which the proximal hitch portion is locked with respect to the distal hitch portion.
Figure 8B:
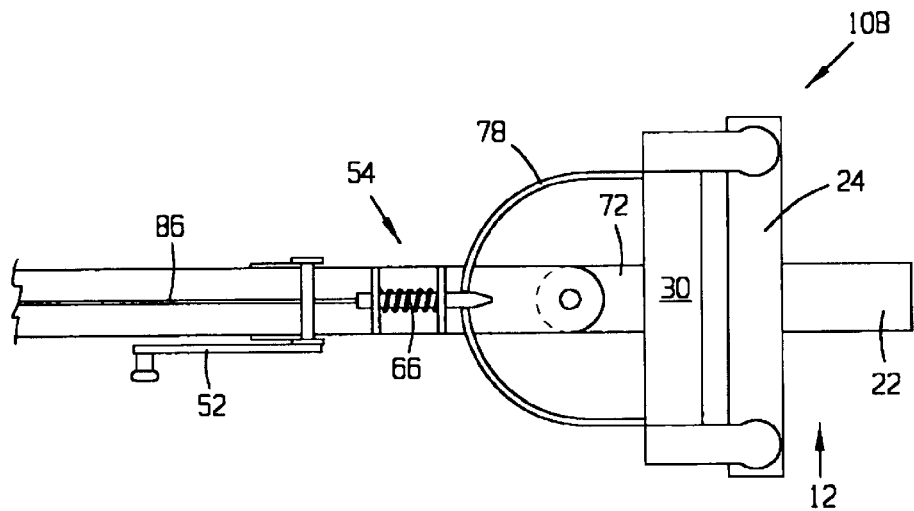
Figure 8C:
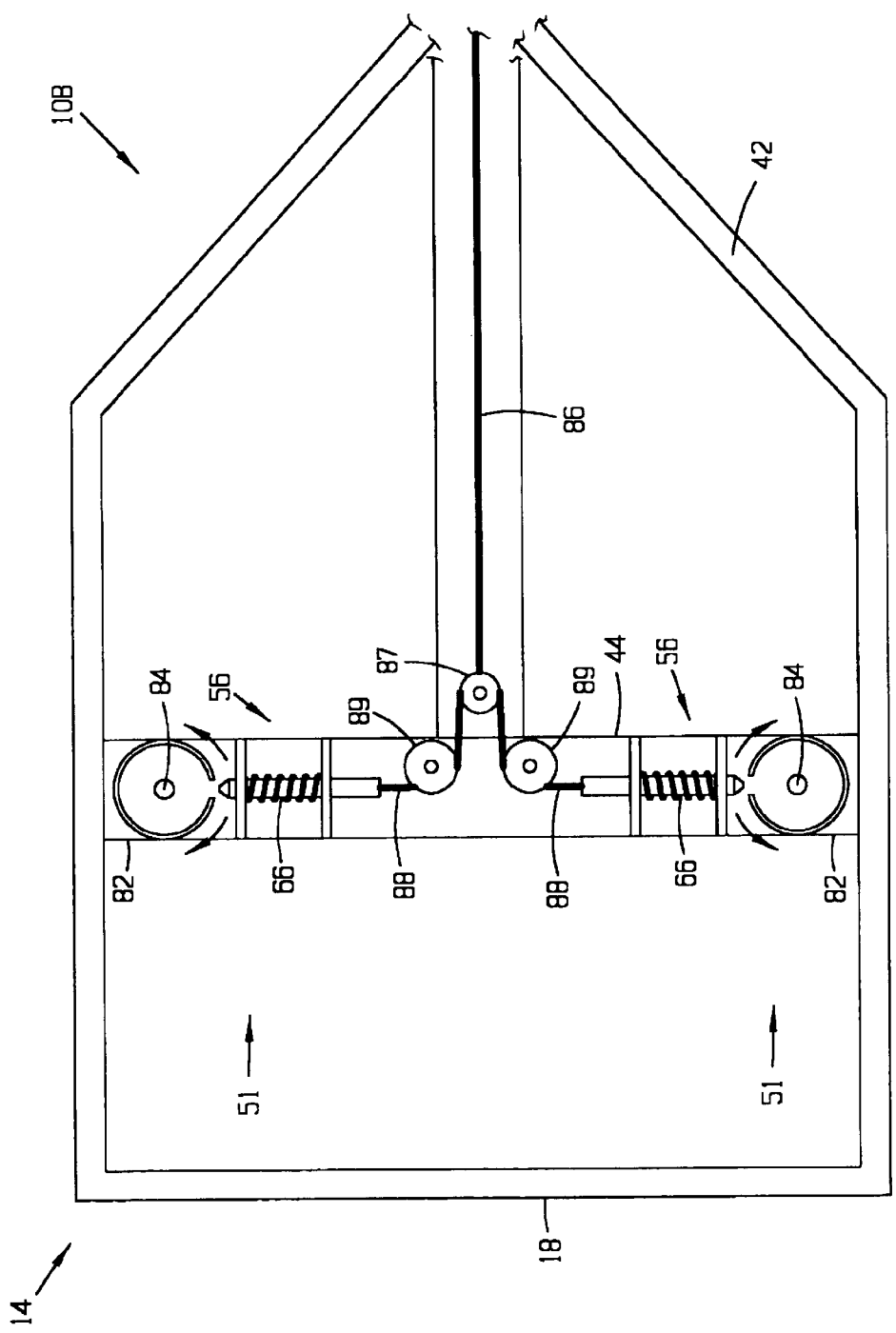
FIG. 8c illustrates the hinged trailer hitch embodiment prepared for backing up, and shows a bottom view in which the caster wheels are released.

FIGS. 7c and 8c illustrate the caster locking system 51. Each caster wheel 20 has a caster drum 82 attached to its spindle 84, with each drum 82 having a pin hole, aperture or other opening. The caster pin locks 56 are positioned adjacent to the caster drums 82, and lock the drums 82, and thus the caster wheels 20, in position when the pins extends into the aperture in the caster drum 82. A caster pin lock cable 88 is attached to the pins 66 in the caster pin locks 56. To retract the pins 66 out of the caster drums 82, the handle 52 pulls on rod 86, which in turns pulls a center part of the cable 88 to retract the pins 66. In the illustrated embodiment, the rod 86 pulls on a center pulley 87, which pulls the center part of the cable 88 and ultimately, through other pulleys 89, retracts the pins 66.

Figure 9:
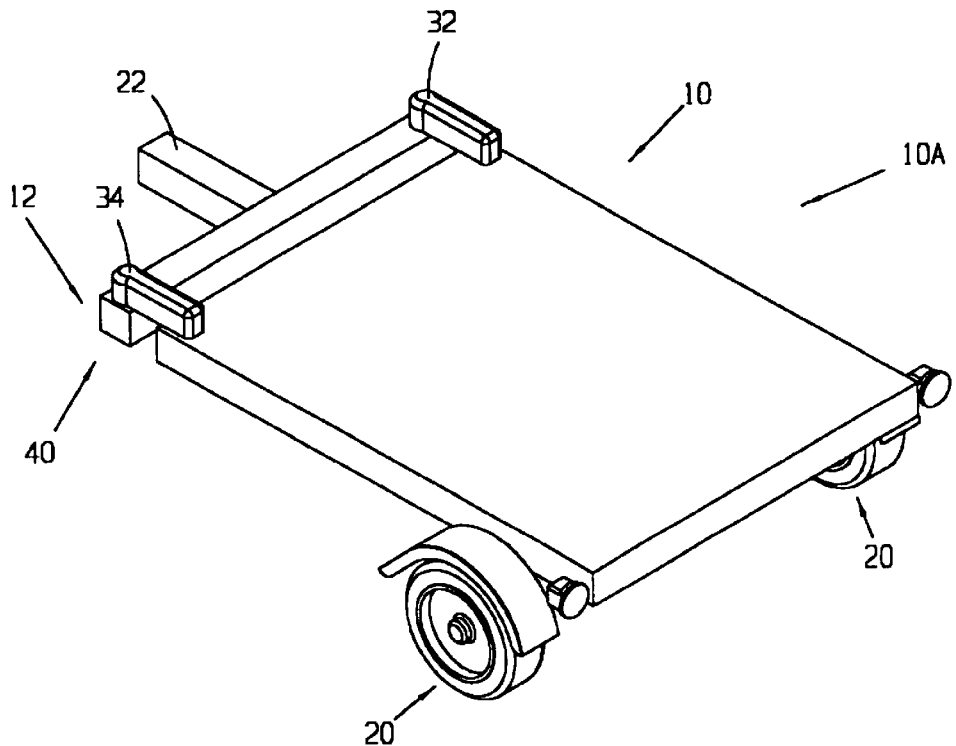
FIG. 9 illustrates a rigid trailer hitch embodiment wherein the caster wheels are continuously capable of swiveling.
Figure 10:
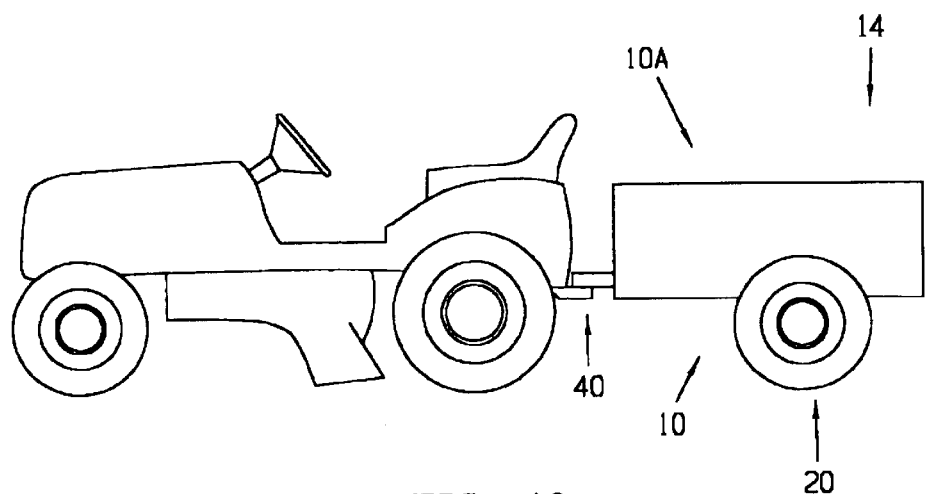
FIG. 10 illustrates the rigid trailer hitch embodiment as a utility trailer being pulled behind a lawn tractor.
Figure 12:
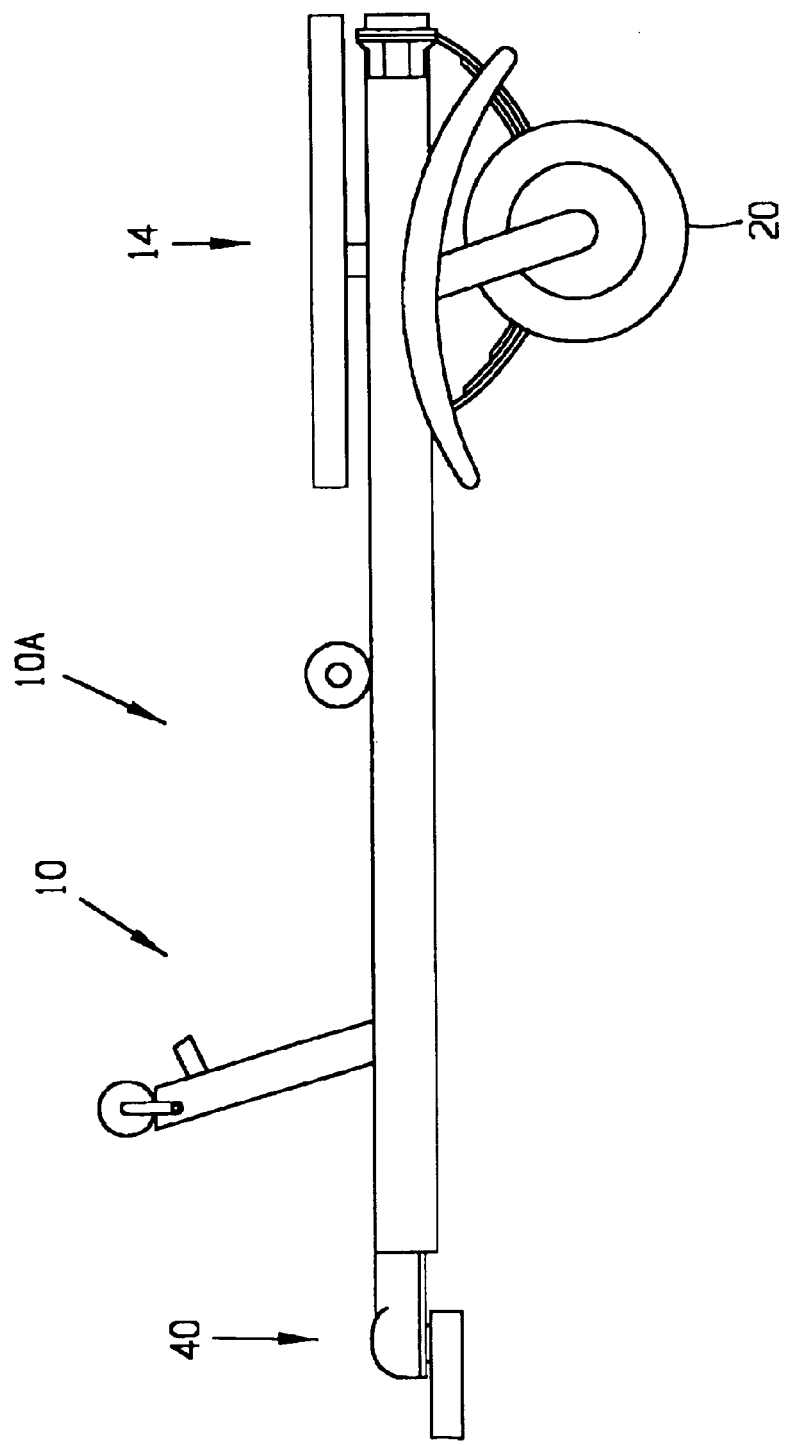
FIG. 12 illustrates a side view of the rigid trailer hitch embodiment as a personal water craft trailer.
Figure 13:
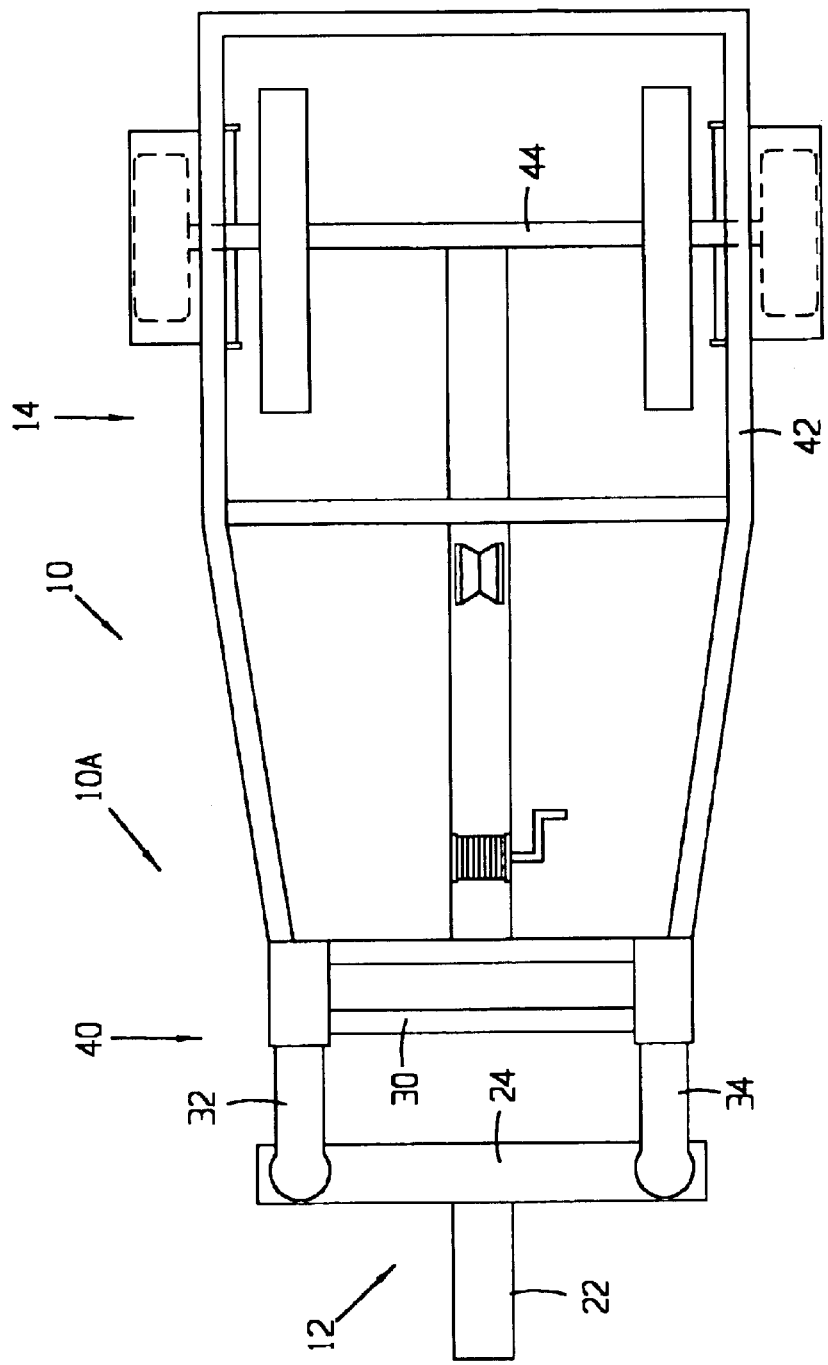
FIG. 13 illustrates a top view of the trailer of FIG. 12.
Figure 15:
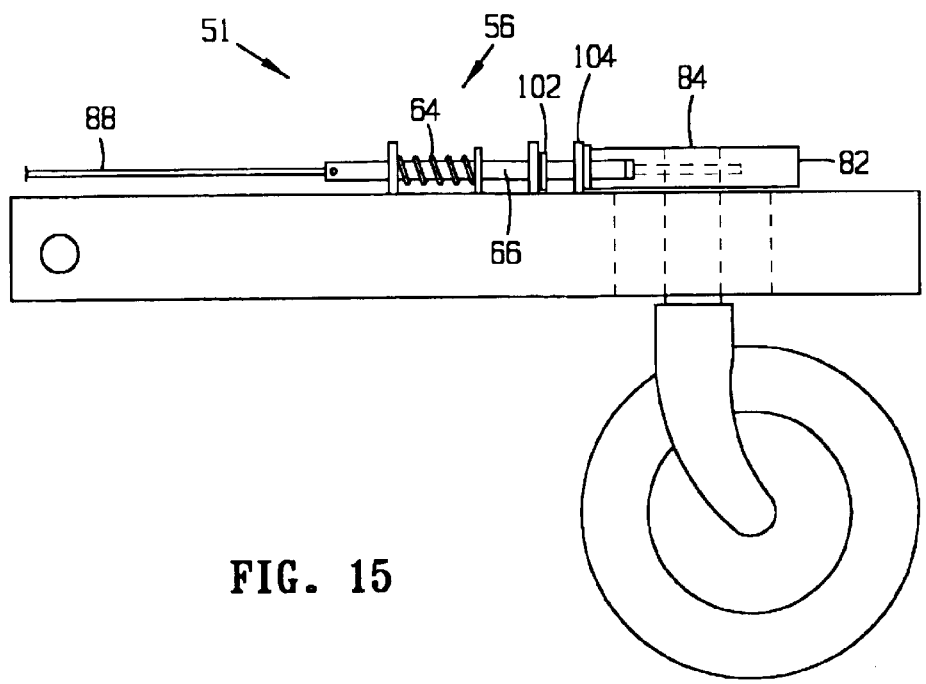
FIG. 15 illustrates a side view of the caster locking system with a caster drum brake device.
Figure 16:
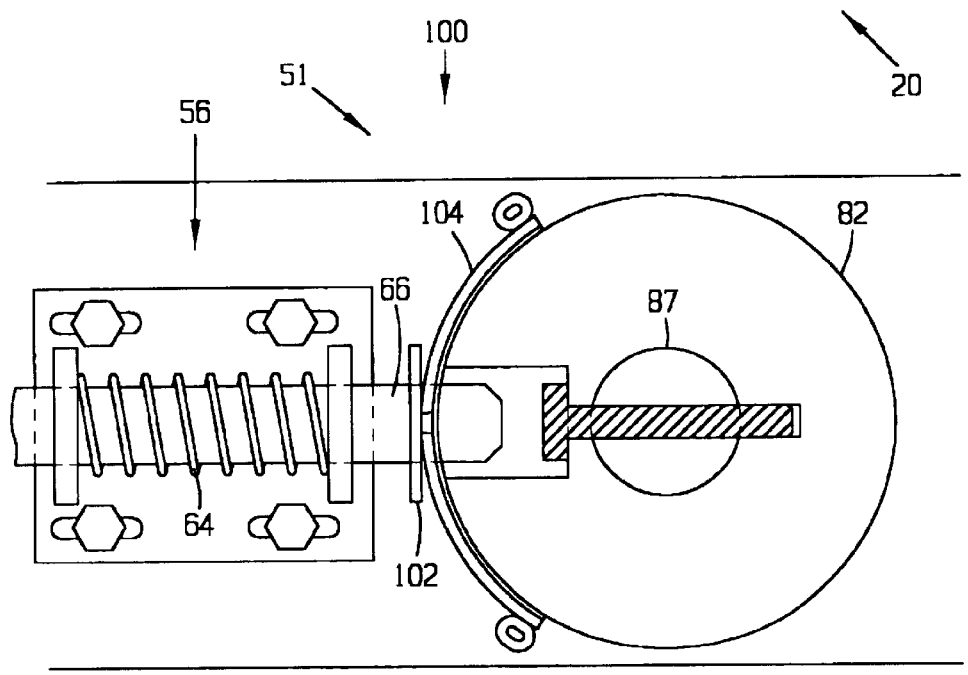
FIG. 16 illustrates a top view of the caster locking system of FIG. 15.
Figure 17:
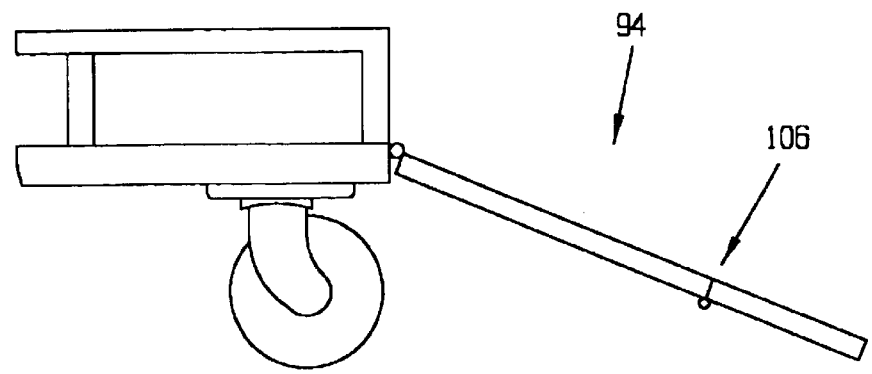
FIG. 17 is a side view of a split folding ramp in an extended position.
Figure 18:
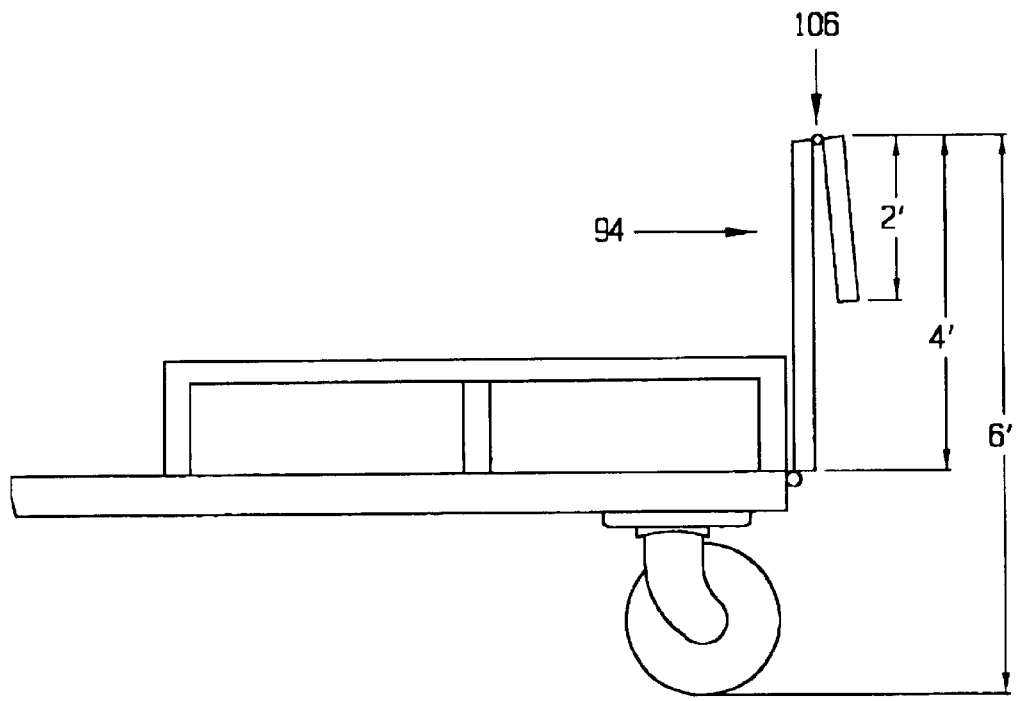
FIG. 18 is a side view of the split folding ramp of FIG. 17 in a raised position.
Figure 19:
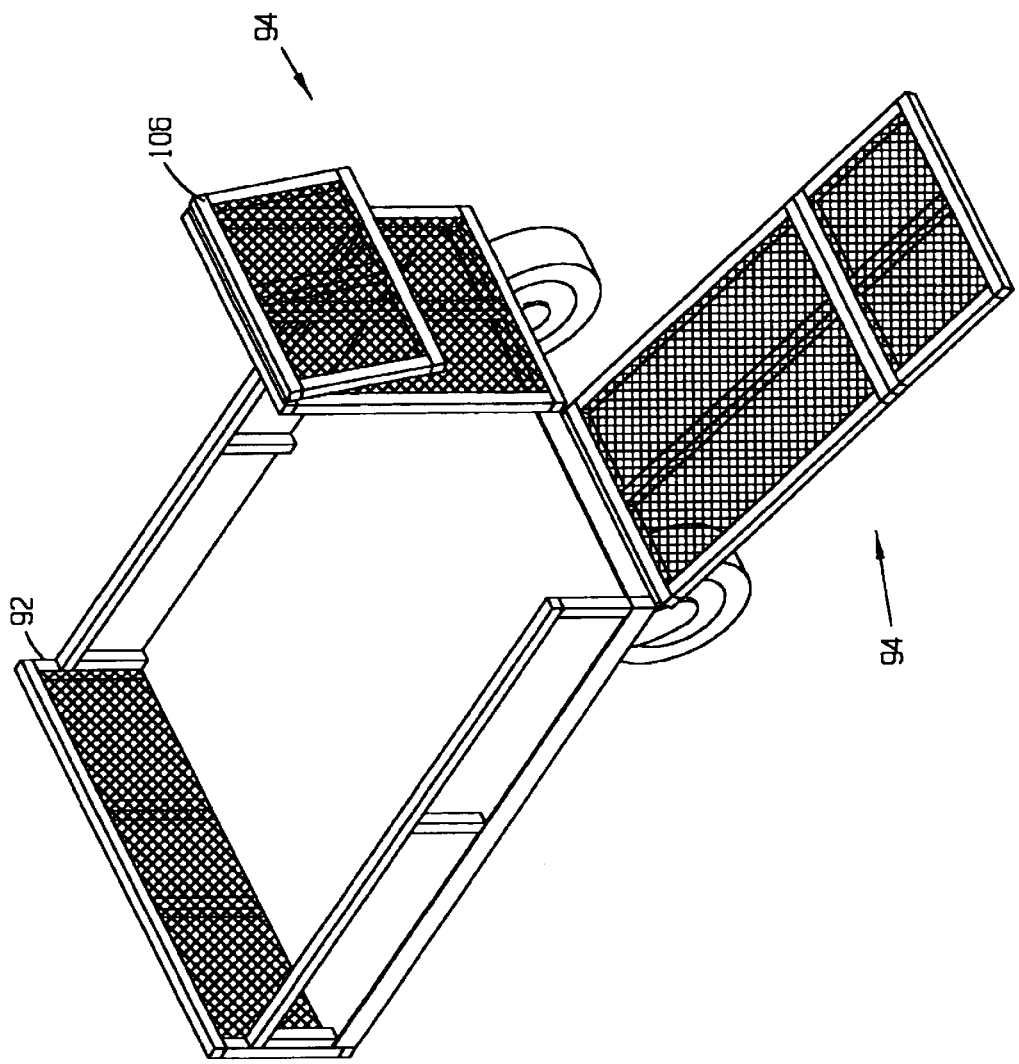
FIG. 19 is a perspective view of the split folding ramp of FIG. 17.

Referring to FIGS. 15 and 16, the caster locking system 51 may include a brake mechanism [90] 100 adapted for preventing a shimmy caused by unbalanced wheels. As illustrated, the brake mechanism 100 comprises an abutment 102 on the locking pin 66, and a brake 104 surrounding the caster drum 82. The abutment 102 contacts the brake 104 when the pin 66 extends into the aperture in the caster drum 82. The abutment 102 may be formed by welding a flat washer onto the pin 66. In order to provide the proper braking characteristics, it may be desirable to adjust the position of the caster pin lock 56. FIG. 16 illustrates that the caster pin lock 56 may be mounted to the frame using a bracket with adjustment slots The trailer system 10 of the present invention can be used in a variety of trailer uses as shown in the figures, including personal water craft, boats, and utility trailers. FIGS. 9 and 10 illustrate rigid trailer hitch embodiments. Additionally, as shown in FIGS. 11a to 11d, the rigid trailer hitch embodiment 10a may include a hinged front wall 92 and a hinged rear wall 94 that form ramps upon which a vehicle can drive from the ground on to the trailer floor, and from the trailer floor onto a vehicle bed, and a second vehicle can drive from the ground on to the trailer floor. Referring to FIGS. 17–19, the hinged rear wall 94 may comprise a split folding ramp.

The purpose of the split loading ramp is to extend the ramp further out from the trailer bed, which "flattens" the ramp and discourages vehicles with a low ground clearance, such as lawn mowers, from becoming hung up at the top of the ramp. Splitting the ramp into two separate ramps cuts the effort required to raise one of the ramps in half, which is desirable because a longer ramp weighs considerably more than a shorter ramp. Additionally, the ramp is folded, preferably four feet from the end, so that there is enough clearance when the ramp is folded up to pass through a standard garage door. For example, if the trailer bed is two feet off of the ground, a six foot ramp may be required to obtain an acceptable angle at the top of the ramp for the low ground clearance vehicles to negotiate. However, if the ramp is folded into an upright position, the trailer could only pass through an eight foot door. A second hinge 106 is formed that allows the ramp to fold on top of itself, and thus shorten the required clearance so that the trailer can pass through the standard seven foot door.

Figure 14:
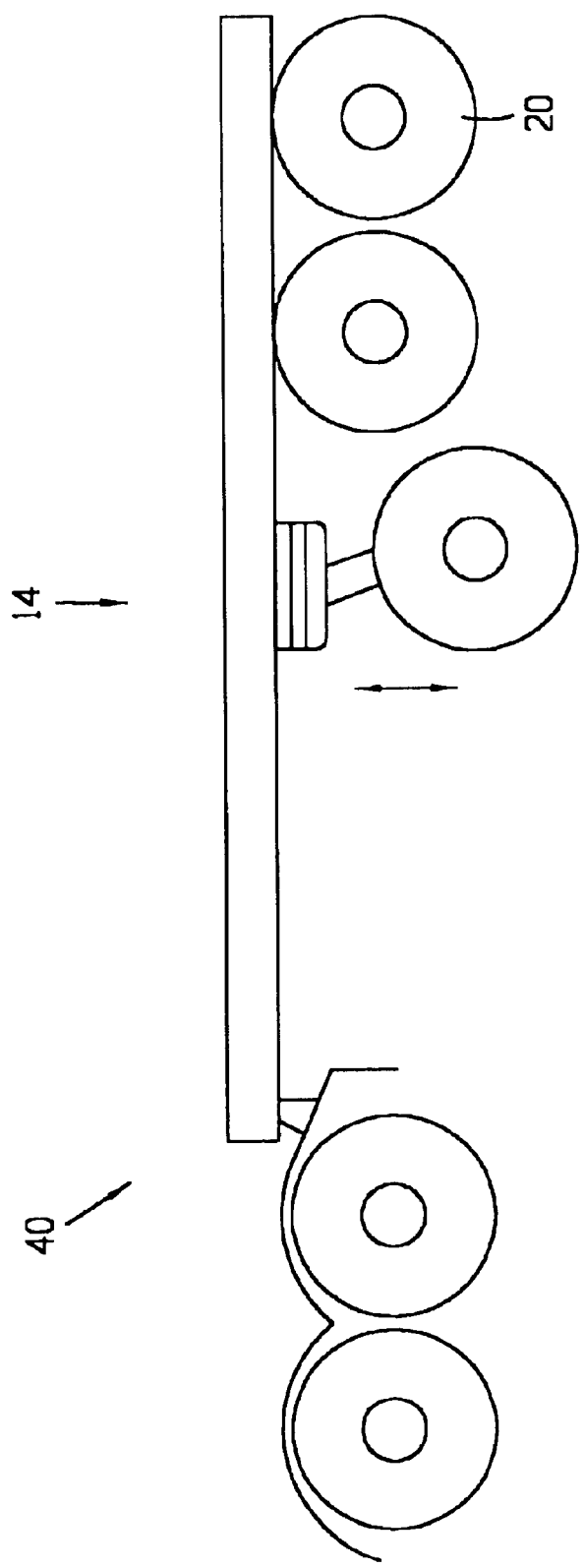
FIG. 14 illustrates a hinged trailer hitch embodiment for a semi-trailer.

As shown in FIG. 14, the hinged trailer hitch embodiment 10b of the present invention can be adapted for a semi-trailer. The caster-type swivel wheel 20 is retractable out of operable ground contact to enable conventional trailer tires to maintain operable ground contact, and is extendable into operable ground contact. The extendible caster-type swivel wheel 20 may be powered in a number of ways. For example, the wheel 20 can be mounted on an air bag activated lifting mechanism powered by the truck pneumatics. The caster wheel 20 is lowered when the trucker desires to back up the trailer. This embodiment works best with a light or empty load, as a full load may cause too much stress at the hitch.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A caster trailer which is easy to back up and which is optimal for towing comprising a trailer coupler portion, a trailer frame attached to said trailer coupler portion, said trailer coupler portion including a trailer hitch, said trailer hitch including a proximal hitch portion, a distal hitch portion and a hinge link connecting said proximal hitch portion to said distal hitch portion, the trailer further comprising an axle rigidly fixed to said distal hitch portion, at least one caster wheel connected to said axle, and a hitch locking mechanism for selective locking of said distal hitch portion in rigid position with respect to said proximal hitch portion in a trailer back up mode and unlocking of said distal hitch portion with respect to said proximal hitch portion for permitting pivotal movement of the distal hitch portion with respect to the proximal hitch portion in a trailer towing mode.

2. The trailer of claim 1, wherein said trailer coupler portion includes a coupler member and a trailer hitch connected to said coupler member.

3. The trailer of claim 2, wherein said coupler member includes at least one socket and wherein at least one ball is connected to a vehicle, said at least one socket being adapted for operably engaging said at least one ball.

4. The trailer of claim 3, wherein said at least one socket is two sockets and said at least one ball is two balls.

5. The trailer of claim 1, wherein said proximal hitch portion and said distal hitch portion have corresponding apertures, said hinge link including a linking pin extending through said corresponding apertures.

6. The trailer of claim 1, wherein said hitch locking mechanism includes a hitch drum attached to one of said hitch portions and a hitch pin lock cooperatively attached to the other one of said hitch portions, said hitch drum having a pin aperture and said hitch pin lock having a pin adapted for extending into said pin aperture to lock said distal hitch portion in position with respect to said proximal hitch portion.

7. The trailer of claim 1, wherein said at least one caster wheel includes a spindle attached to and adapted for swiveling with respect to said trailer frame, said trailer further having a caster locking system adapted for preventing said spindle from swiveling with respect to said trailer frame.

8. The trailer of claim 7, wherein said caster locking system comprises a drum attached to said spindle of said at least one caster and further comprises a hitch pin lock having a body and a pin, said drum having a pin aperture through which said pin may extend.

9. The trailer of claim 7, wherein said caster locking system includes a brake mechanism adapted for preventing a shimmy.

10. The trailer of claim 1, further comprising a set of conventional trailer tires attached to said trailer frame, said at least one caster wheel being adapted for retracting and extending into operable ground contact.

11. The trailer of claim 1, further comprising a hitch coupler portion adapted to be attached to a vehicle hitch, wherein said hitch coupler portion, said trailer coupler portion, said trailer frame and said at least one caster wheel comprise a trailer system.

12. The trailer of claim 11, wherein said hitch coupler portion includes a connection member connected to a lateral member, said connection member being adapted to be attached to said vehicle hitch, said lateral member having a first end and a second end, both said first end and said second end having an attached ball.

13. The trailer of claim 12, wherein said connection member is connected to and adapted for swiveling with respect to said lateral member.

14. The trailer of claim 13, wherein said lateral member includes a bushing and said connection member includes an axle adapted for swiveling within said bushing.

15. The trailer of claim 12, wherein said lateral member is orthogonal to said connection member.

16. The trailer of claim 1, wherein said trailer frame includes a cross bar attached to said trailer hitch, and a skirt attached to said trailer hitch and said cross bar.

17. The trailer of claim 1, further comprising a floor attached to said trailer frame, a front trailer wall and a rear trailer wall hinged to said floor, said rear trailer wall adapted to form a ramp up to said floor and said front trailer wall adapted to form a ramp up to a vehicle bed.

18. The trailer of claim 1, further comprising a floor attached to said trailer frame, said rear trailer wall forming a split folding ramp.

19. A trailer, comprising:
(a) a trailer coupler portion, said trailer coupler portion comprising a tailer hitch including:
(i) a proximal hitch portion;
(ii) a distal hitch portion;
(iii) a hinge link connecting said proximal hitch portion to said distal hitch portion; and
(iv) a hitch locking mechanism adapted for locking said distal hitch portion in position with respect to said proximal hitch portion;
(b) a trailer frame attached to said trailer coupler portion;
(c) at least one caster wheel attached to said trailer frame, including a spindle attached to and adapted for swiveling with respect to said trailer frame; and
(d) a caster locking system adapted for preventing said spindle from swiveling with respect to said trailer frame, said caster locking system including a drum attached to said spindle of said at least one caster and further including a hitch pin lock having a body and a pin, said drum having a pin aperture through which said pin may extend to prevent said spindle from swiveling.

20. A trailer system, comprising:
(a) a hitch coupler portion including a connection member connected to a lateral member, said connection member being adapted to be attached to said vehicle hitch, said lateral member having an attached first and second ball;
(b) a trailer coupler portion, comprising:
(i) a coupler member including two sockets adapted for operably engaging said first and second ball; and
(ii) a trailer hitch, including a proximal hitch portion; a distal hitch portion, a hinge link connecting said proximal hitch portion to said distal hitch portion; and a hitch locking mechanism adapted for locking said distal hitch portion in position with respect to said proximal hitch portion;
(c) a trailer frame attached to said trailer coupler portion;
(d) at least one caster wheel attached to said trailer frame, including a spindle attached to and adapted for swiveling with respect to said trailer frame; and
(e) a caster locking system adapted for preventing said spindle from swiveling with respect to said trailer frame, said caster locking system including a drum attached to said spindle of said at least one caster and further including a hitch pin lock having a body and a pin, said drum having a pin aperture through which said pin may extend to prevent said spindle from swiveling.

21. A trailer, comprising a trailer coupler portion, a trailer frame attached to said trailer coupler portion, at least one caster wheel attached to said trailer frame and including a spindle attached to and adapted for swiveling with respect to said trailer frame, and a caster locking system adapted for preventing said spindle from swiveling with respect to said trailer frame.

* * * * *